United States Patent
Chen et al.

(10) Patent No.: US 10,375,438 B2
(45) Date of Patent: Aug. 6, 2019

(54) METHOD FOR CONTENT PROJECTION AND MOBILE TERMINAL

(71) Applicant: TENCENT TECHNOLOGY (SHENZHEN) COMPANY LIMITED, Shenzhen, Guangdong (CN)

(72) Inventors: Xiangyi Chen, Shenzhen (CN); Yu Guo, Shenzhen (CN); Song Cai, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 66 days.

(21) Appl. No.: 15/688,702

(22) Filed: Aug. 28, 2017

(65) Prior Publication Data
US 2017/0359618 A1    Dec. 14, 2017

Related U.S. Application Data

(63) Continuation of application No. PCT/CN2016/081933, filed on May 12, 2016.

(30) Foreign Application Priority Data

Nov. 5, 2015    (CN) .......................... 2015 1 0750032

(51) Int. Cl.
*H04N 21/41*    (2011.01)
*H04N 21/414*    (2011.01)
(Continued)

(52) U.S. Cl.
CPC ... *H04N 21/43615* (2013.01); *H04N 21/4122* (2013.01); *H04N 21/4126* (2013.01);
(Continued)

(58) Field of Classification Search
CPC ......... H04N 21/43615; H04N 21/4122; H04N 21/4126; H04N 21/41407; H04N 21/4312; H04N 21/482
(Continued)

(56) References Cited

U.S. PATENT DOCUMENTS

| 8,504,672 B2 | 8/2013 | Schmidt |
| 8,799,443 B2 | 8/2014 | Schmidt et al. |

(Continued)

FOREIGN PATENT DOCUMENTS

| CN | 103202000 A | 7/2013 |
| CN | 104113607 A | 10/2014 |

(Continued)

OTHER PUBLICATIONS

English Translation of the Written Opinion of the International Search Authority in international application No. PCT/CN20161081933, dated Jul. 26, 2016.
(Continued)

*Primary Examiner* — Nathan J Flynn
*Assistant Examiner* — Caroline Somera
(74) *Attorney, Agent, or Firm* — Oppedahl Patent Law Firm LLC

(57) ABSTRACT

A method for content projection and a mobile terminal are provided. The method includes that a mobile terminal runs a local playing service, a content projection control service and at least two protocol projection control services. A first projection instruction is acquired through the content projection control service, a first content played by the local playing service is intercepted, and the intercepted first content is transmitted to first protocol projection control service. The first content is transmitted to a first projection service through the first protocol projection control service by virtue of a first projection protocol.

19 Claims, 20 Drawing Sheets

(51) Int. Cl.
*H04N 21/431* (2011.01)
*H04N 21/436* (2011.01)
*H04N 21/482* (2011.01)

(52) U.S. Cl.
CPC ... *H04N 21/41407* (2013.01); *H04N 21/4312* (2013.01); *H04N 21/482* (2013.01)

(58) Field of Classification Search
USPC .......................................................... 725/80
See application file for complete search history.

(56) References Cited

U.S. PATENT DOCUMENTS

| | | | |
|---|---|---|---|
| 8,990,703 | B2 | 3/2015 | Nhiayi |
| 2010/0257560 | A1 | 10/2010 | Fukuda |
| 2011/0119713 | A1 | 5/2011 | Chang |
| 2012/0131153 | A1 | 5/2012 | Schmidt |
| 2012/0198350 | A1 | 8/2012 | Nhiayi |
| 2013/0326030 | A1 | 12/2013 | Schmidt et al. |
| 2013/0346564 | A1 | 12/2013 | Warrick et al. |
| 2014/0143380 | A1 | 5/2014 | Warrick et al. |
| 2015/0052193 | A1* | 2/2015 | Farrell ................. H04L 65/608 709/203 |
| 2015/0052222 | A1* | 2/2015 | Farrell ................. H04L 65/608 709/217 |
| 2015/0146019 | A1 | 5/2015 | Aoyama |
| 2016/0014166 | A1 | 1/2016 | Warrick et al. |
| 2016/0105695 | A1 | 4/2016 | Qu et al. |
| 2016/0295296 | A1 | 10/2016 | Zhu |
| 2017/0353506 | A1 | 12/2017 | Warrick et al. |
| 2018/0286129 | A1* | 10/2018 | Harviainen ........... G06F 3/1423 |

FOREIGN PATENT DOCUMENTS

| | | |
|---|---|---|
| CN | 104754426 A | 7/2015 |
| EP | 2328345 A2 | 6/2011 |
| JP | H06311164 A | 11/1994 |
| JP | 2010026780 A | 2/2010 |
| JP | 2010245904 A | 10/2010 |
| JP | 2011035780 A | 2/2011 |
| JP | 2014050054 A | 3/2014 |
| JP | 2014222432 A | 11/2014 |
| WO | 2014176019 A1 | 10/2014 |

OTHER PUBLICATIONS

Supplementary European Search Report in European application No. 16861229.9, dated Aug. 17, 2018.
English Translation of the Notification of the First Office Action of Japanese application No. 2018-506475, dated Sep. 3, 2018.
International Search Report in international application No. PCT/CN2016/081933, dated Jul. 26, 2016.

* cited by examiner

METHOD FOR CONTENT PROJECTION AND MOBILE TERMINAL

CROSS-REFERENCE TO RELATED APPLICATIONS

The present application is continuation of International Application No. PCT/CN2016/081933 which is filed based on and claims priority to Chinese Application No. 201510750032,8, filed by Tencent Technology (Shenzhen) Co., Ltd. on Nov. 5, 2015 and titled with "method and mobile terminal for content projection", the contents of which are hereby incorporated by reference in its entirety.

TECHNICAL FIELD

The present disclosure relates to a content projection technology in the field of communications, and in particular to a method for content projection and a mobile terminal.

BACKGROUND

Content projection at a mobile terminal refers to that a user may play a video originally played on the mobile terminal on playing equipment such as a television through a multi-screen interactive projection protocol such as a Digital Living Network Alliance (DLNA) projection protocol and an AirPlay projection protocol or through a set-top box. Such content projection may break the limit that a screen of a mobile terminal is small and greatly improve the viewing experience of a user.

At present, projection at a mobile terminal is usually implemented as follows. A projection application in the mobile terminal acquires a playing address of a video, and sends the playing address through a projection protocol such as DLNA or AirPlay to a projection service which supports projection, the projection service usually running on playing equipment such as a television or a television box. The projection service of the playing equipment renders a playing picture on a screen through a player of the playing equipment after acquiring the address of the video. Since the projection protocol may usually support a control logic such as playing and pausing, the mobile terminal may keep communication with the service to control a playing process.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to an aspect of the present disclosure, there is provided a method for content projection. The method may include that a mobile terminal runs a local playing service, a content projection control service and at least two protocol projection control services, wherein different protocol projection control service may support different projection protocols. A first projection instruction is acquired through the content projection control service, a first content played by the local playing service is intercepted, and the intercepted first content is transmitted to a first protocol projection control service, wherein the first protocol projection control service may be a protocol projection control service, among the at least two protocol projection control services, which detects a first projection service issued by playing equipment. The first content is transmitted to the first projection service through the first protocol projection control service by virtue of a first projection protocol. The first content is configured for the first projection service to play on a corresponding playing equipment. The first protocol projection control service and the first projection service may both support the first projection protocol.

According to another aspect of the present disclosure, there is provided a mobile terminal. The mobile terminal may include a processor and a memory. The memory stores instructions that, when executed by the processor, cause the processor to run a local playing service, a content projection control service and at least two protocol projection control services, wherein different protocol projection control service may support different projection protocols. The processor is further caused by instructions to acquire a first projection instruction through the content projection control service, intercept a first content played by the local playing service, and transmit the intercepted first content to a first protocol projection control service, wherein the first protocol projection control service may be a protocol projection control service, among the at least two protocol projection control services, which detects a first projection service issued by playing equipment. The processor is further caused by instructions to transmit the first content to the first projection service through the first protocol projection control service by virtue of a first projection protocol. The first content is configured for the first projection service to play on the corresponding playing equipment, wherein the first protocol projection control service and the first projection service may both support the first projection protocol.

According to still another aspect of aspects of the present disclosure, a non-transitory computer-readable storage medium is provided. The non-transitory computer-readable storage medium has stored therein instructions that, when executed by a processor of a terminal, cause the terminal to perform a method for controlling a touch screen of the terminal. The method includes that a mobile terminal runs a local playing service, a content projection control service and at least two protocol projection control services, wherein different protocol projection control service may support different projection protocols. A first projection instruction is acquired through the content projection control service, a first content played by the local playing service is intercepted, and the intercepted first content is transmitted to a first protocol projection control service, wherein the first protocol projection control service may be a protocol projection control service, among the at least two protocol projection control services, which detects a first projection service issued by playing equipment. The first content is transmitted to the first projection service through the first protocol projection control service by virtue of a first projection protocol. The first content is configured for the first projection service to play on a corresponding playing equipment. The first protocol projection control service and the first projection service may both support the first projection protocol.

DETAILED DESCRIPTION

Figure 1:
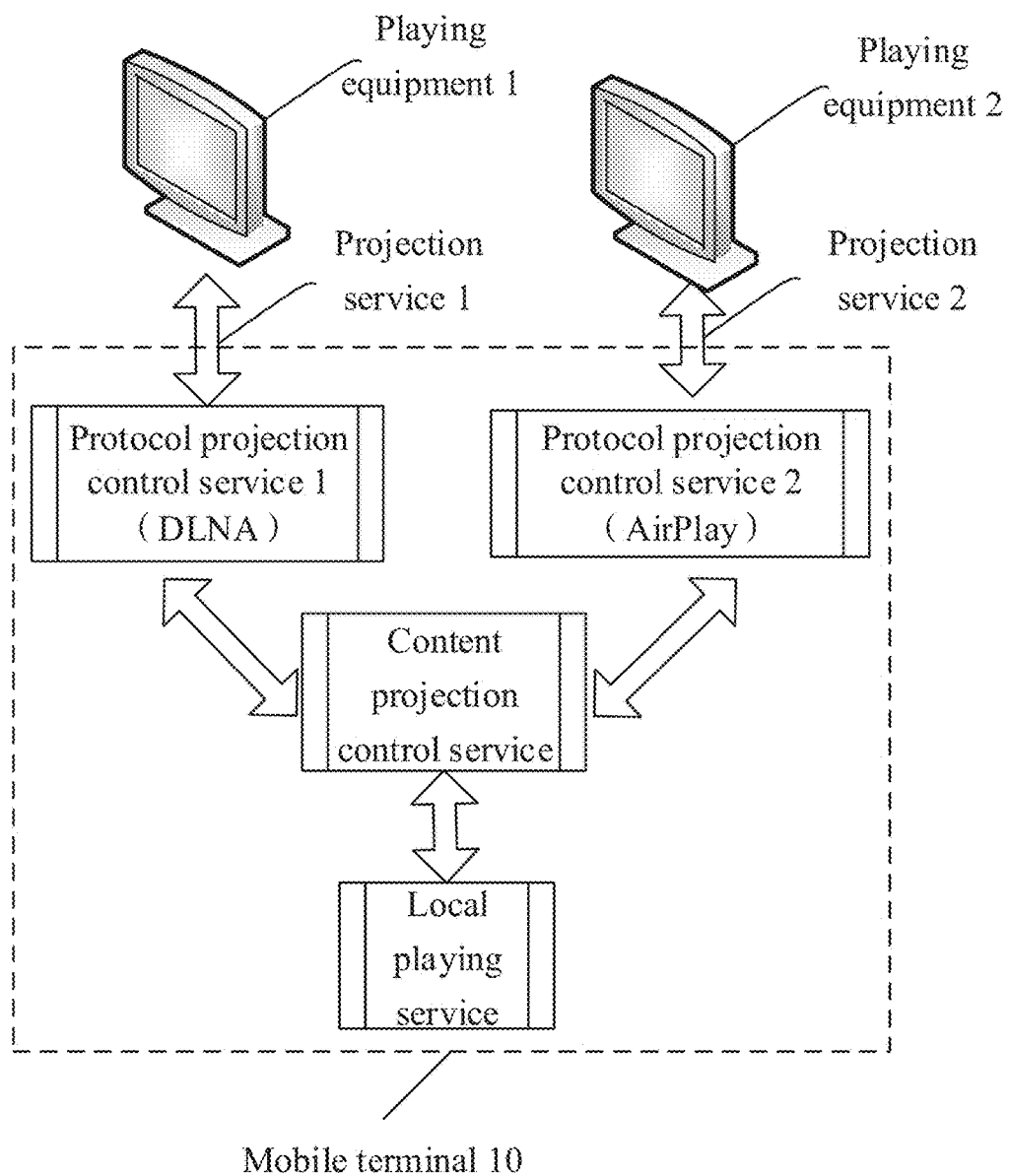
FIG. 1 is schematic diagram 1 of running a service at a mobile terminal according to an embodiment of the present disclosure.

The present disclosure will be further described below in detail with reference to the drawings and embodiments. It is to be understood that the specific embodiments described here are exemplary and explanatory and are not restrictive of the present disclosure, as claimed.

Reference will now be made in detail to exemplary aspects of the present disclosure, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims. In addition, it is to be noted that for convenience of description, only parts relevant to the present disclosure, instead of all structures, are shown in the accompanying drawings.

Certain terms used in the present disclosure are only intended to describe specific aspects, but are not intended to limit the present disclosure. For example, singular form words "a," "said," and "the" used in the present disclosure and the appended claims are intended to include plural form, unless otherwise clearly stated. Also, the term "and/or" used herein refers to any or all combinations of one or more listed related items.

It is to be understood that although the aspects of the present disclosure may apply terms including first, second, third and so on to describe various information, these information should not be limited to these terms. These terms are only used for distinguishing information of the same type from each other. For example, first information may be also called second information without departing from the scope of the aspects of the present disclosure, and similarly, second information may be also called first information, which depends on context. For example, the word "if" used here may be interpreted as "at the moment when . . . " or "when . . . " or "in response to confirmation".

It is to be noted that although the flowcharts in some exemplary aspects describe each step as a sequenced process, a variety of steps therein may be implemented in parallel, concurrently or simultaneously. In addition, the sequence of all steps may be re-arranged. When the operation is completed, the process may be ended, but additional steps not included in the accompanying drawings may be executed. The process may correspond to a method, a function, a regulation, a sub-routine, a sub-program and the like.

A mobile terminal in the embodiments of the present disclosure will now be described with reference to the drawings. The mobile terminal may be implemented in various forms. For example, the mobile terminal may be a smart phone, a tablet computer, a notebook computer or wearable equipment (such as smart glasses, a smart watch or the like), and an operating system of the mobile terminal may be an Android operating system, an iPhone Operating System (iOS) or any other operating system (such as a mobile Linux system, a Blackberry Quick Unix (QNX) operating system or the like) which is developed by a third party and may run in a microcomputer structure (at least including a processor and a memory). Descriptions are made by taking a smart phone as an example of a mobile terminal in the drawings as shown in the embodiments of the present disclosure, which may not form limits to the types of a mobile terminal employed in the technical solutions described in the embodiments of the present disclosure.

Figure 2:
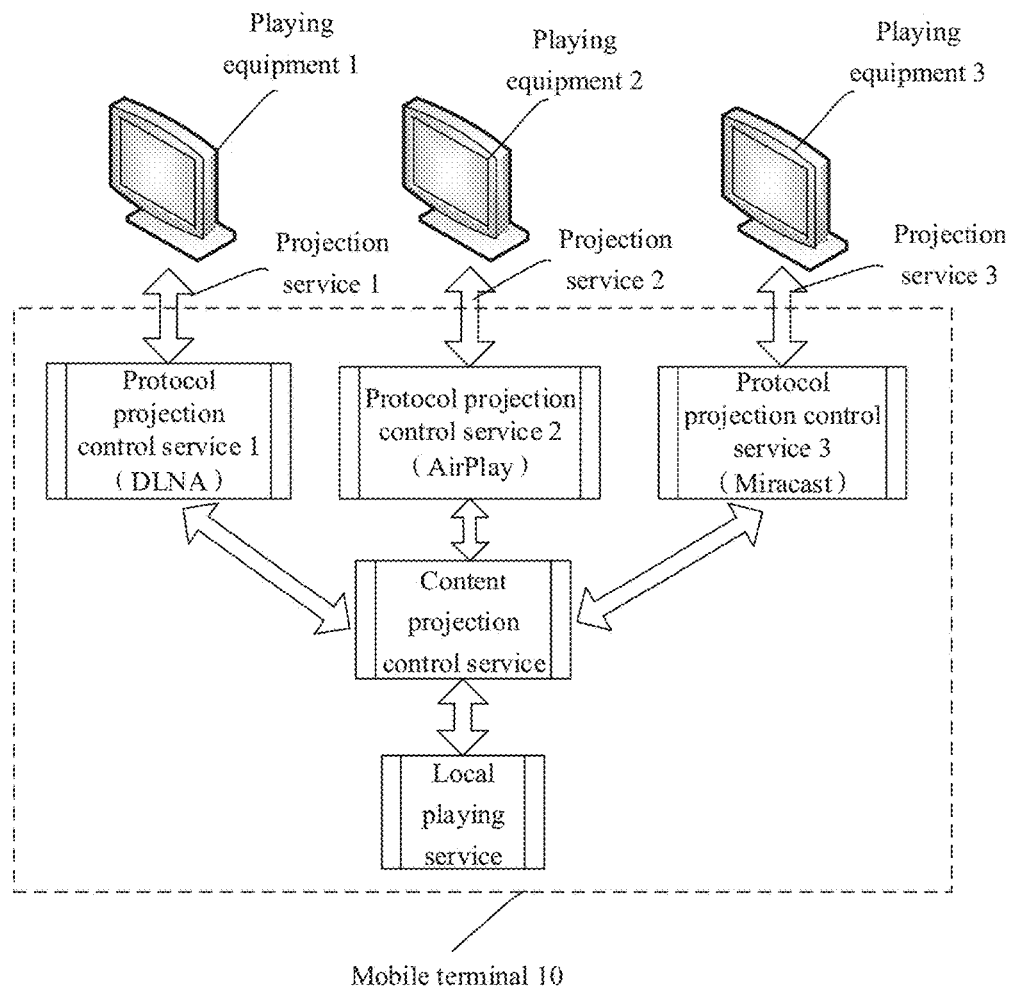
FIG. 2 is schematic diagram 2 of running a service at a mobile terminal according to an embodiment of the present disclosure.

Referring to FIG. 1, a mobile terminal 10 runs a multi-media playing application (called as a projection application for short, such as a video playing application) with a projection function. The projection application includes multiple functional modules: a local playing service, a content projection control service and at least two protocol projection control services (descriptions are made with protocol projection control service 1 and protocol projection control service 2 in FIG. 1 as an example), wherein different protocol projection control services support different projection protocols. For example, the protocol projection control service 1 may support a DLNA projection protocol and the protocol projection control service 2 may support an AirPlay projection protocol. In a practical application, the number of the protocol projection control services run by the mobile terminal is determined according to the number of projection protocols to be supported. For example, as shown in FIG. 2, if a Miracast projection protocol is also needed to be supported, the mobile terminal may also run protocol projection control service 3 to support the Miracast projection protocol.

The mobile terminal plays a first content on a display interface of the mobile terminal through the local playing service (the first content here does not refer to a special content, but to any content which is first triggered to be displayed on the display interface of the mobile terminal; the first content is named only for being distinguished from a content, i.e. a second content, subsequently triggered to be displayed on the display interface of the mobile terminal). The content projection control service is configured to cooperate with at least two protocol projection control services to realize the following functions.

1) The first content is transmitted to a first projection service (the first projection service does not specifically refer to a first projection service; during a practical application, playing equipment may issue multiple projection services, wherein different projection services use different projection protocols; here, the first projection service refers to a projection service to be used, which is selected by the mobile terminal through the content projection control service, so as to be distinguished from the projection service subsequently selected to be used for the mobile terminal through the content projection control service) using a specific projection protocol (such as the abovementioned DLNA projection protocol, AirPlay projection protocol and Miracast projection protocol) for the first projection service to play the first content on corresponding playing equipment, and the at least two protocol projection control services are run to achieve compatibility of different projection services (using different projection protocols) issued by the playing equipment.

2) After the mobile terminal transmits the first content to the first projection service through first protocol projection control service, if it is needed to locally play the second content (any content different from the first content) through the local playing service, the first projection service for the first content is maintained through the first protocol projection control service to continue playing the first content on the playing equipment. In such a manner, when the mobile terminal watches the second content different from the projected first content, the first projection service is not interrupted from projecting the first content to the playing equipment, and thus a flexible and smooth operating experience is brought to a user.

3) When the first content is transmitted to the first projection service through the first protocol projection control service, if an instruction of switching the first protocol projection control service to a background is acquired through the content projection control service (for example, the user may need to switch the projection application to the background at this moment), an operation of switching to the background is executed through the first protocol projection control service, and the first projection service for the first content is maintained. In such a manner, when the mobile terminal switches the projection application to the background for other operations, the first projection service is not interrupted from projecting the first content to the playing equipment, and the flexible and smooth operating experience is thus brought to the user.

4) The first content in different formats is tried to be transmitted to the first projection service through the first protocol projection control service by virtue of a first projection protocol until the first projection service successfully plays the first content in a certain format on the corresponding playing equipment. Even for the same projection protocol, a projection service (a first projection service) issued for the same projection protocol by different playing equipment may show different capabilities of supporting different formats of the first content. The first content in different formats is transmitted to the first projection service to ensure that the first projection service acquiring the first content may play the first content on the corresponding playing equipment, so that compatibility with different playing equipment is improved.

5) The controlling of a status of the first projection service, such as fast forward, fast backward and resolution selection of playing of the first content, is convenient for a user to control projection of the first content to the playing equipment.

6) The switching of the projection service, that is, the switching of the playing equipment at which the first content is projected, can satisfy the requirement of the user on switching of the playing equipment anytime anywhere.

7) The projection protocol used for projecting the first content is switched. For the playing equipment which issues the first projection service (using the first projection protocol), if the playing equipment also issues a second projection service (using a second projection protocol), the projection protocol currently used for projecting the first content to the playing equipment may be switched.

Realization of the abovementioned functions will be described below with reference to examples.

EXAMPLE 1

Figure 3:
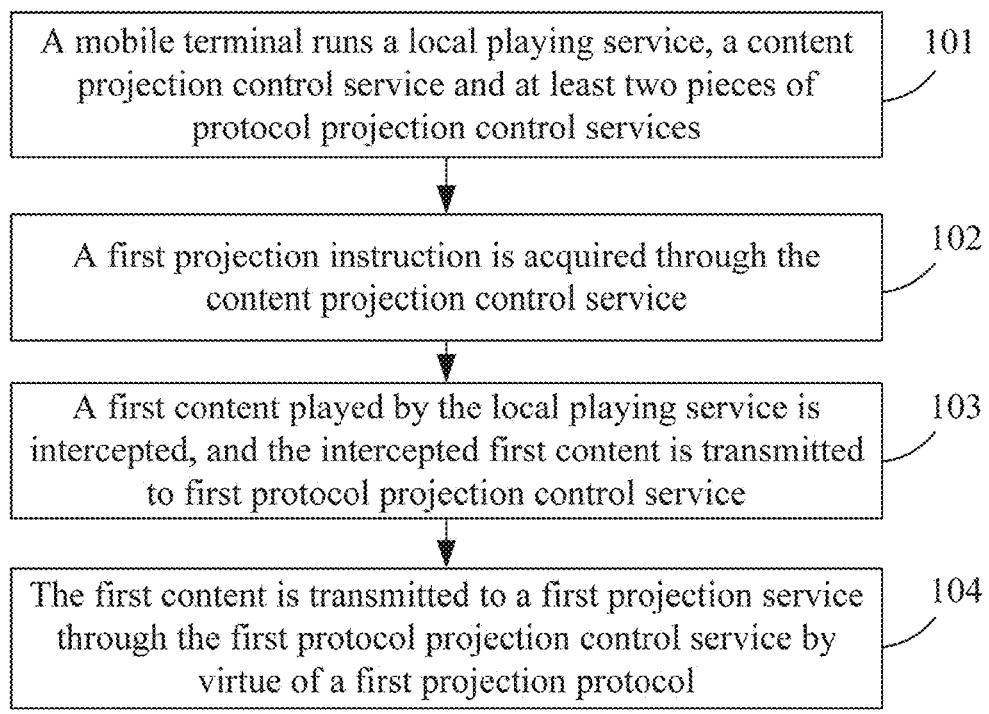
FIG. 3 is schematic diagram 1 of implementing a method for content projection according to an embodiment of the present disclosure.

Corresponding to the function 1), in combination with FIG. 1 and referring to an optional flowchart of content projection shown in FIG. 3, when a mobile terminal runs a projection application, the mobile terminal runs a local playing service, a content projection control service and at least two protocol projection control services (Step 101), wherein protocol projection control service 1 supports a DLNA projection protocol, and protocol projection control service 2 supports an AirPlay projection protocol. The mobile terminal acquires a list of contents (an address list of video contents such as TV dramas and concerts) which may be played on a display interface of the mobile terminal from a media server of a network side through the local playing service in the projection application.

Figure 4:
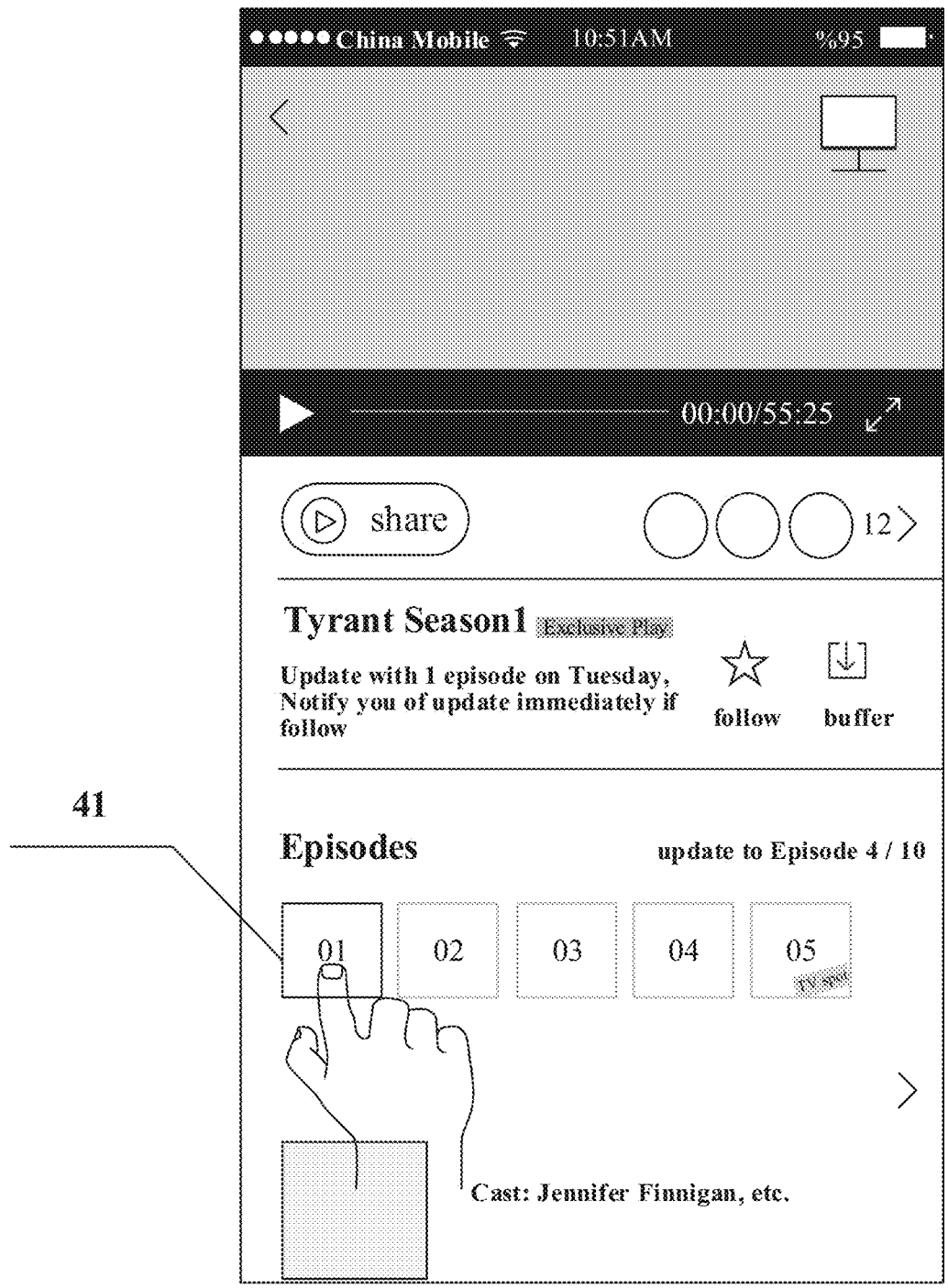
FIG. 4 is an operation diagram of selecting a first content for playing at a mobile terminal according to an embodiment of the present disclosure.
Figure 5:
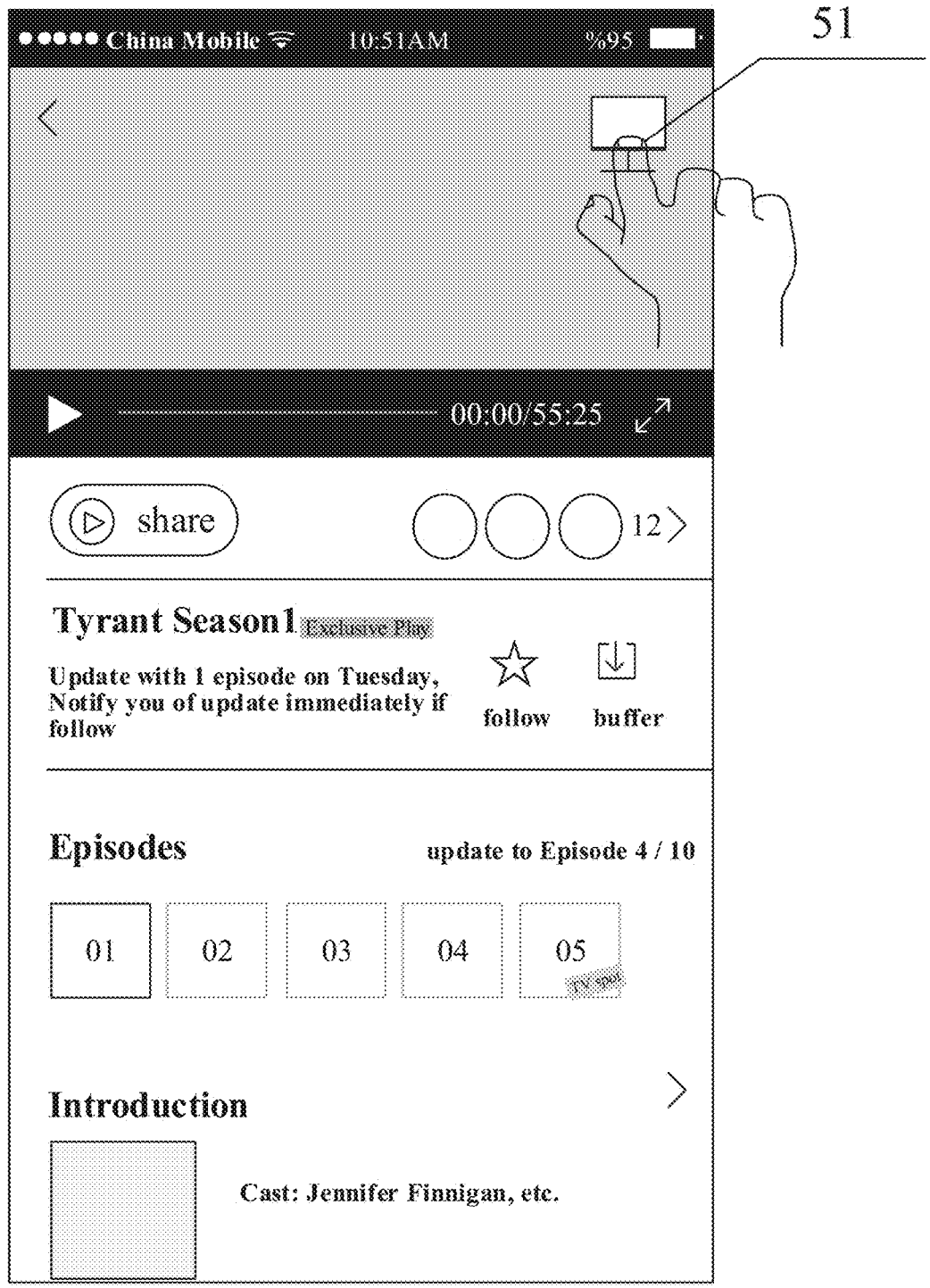
FIG. 5 is a schematic diagram of projecting a locally played content to playing equipment according to an embodiment of the present disclosure.
Figure 6:
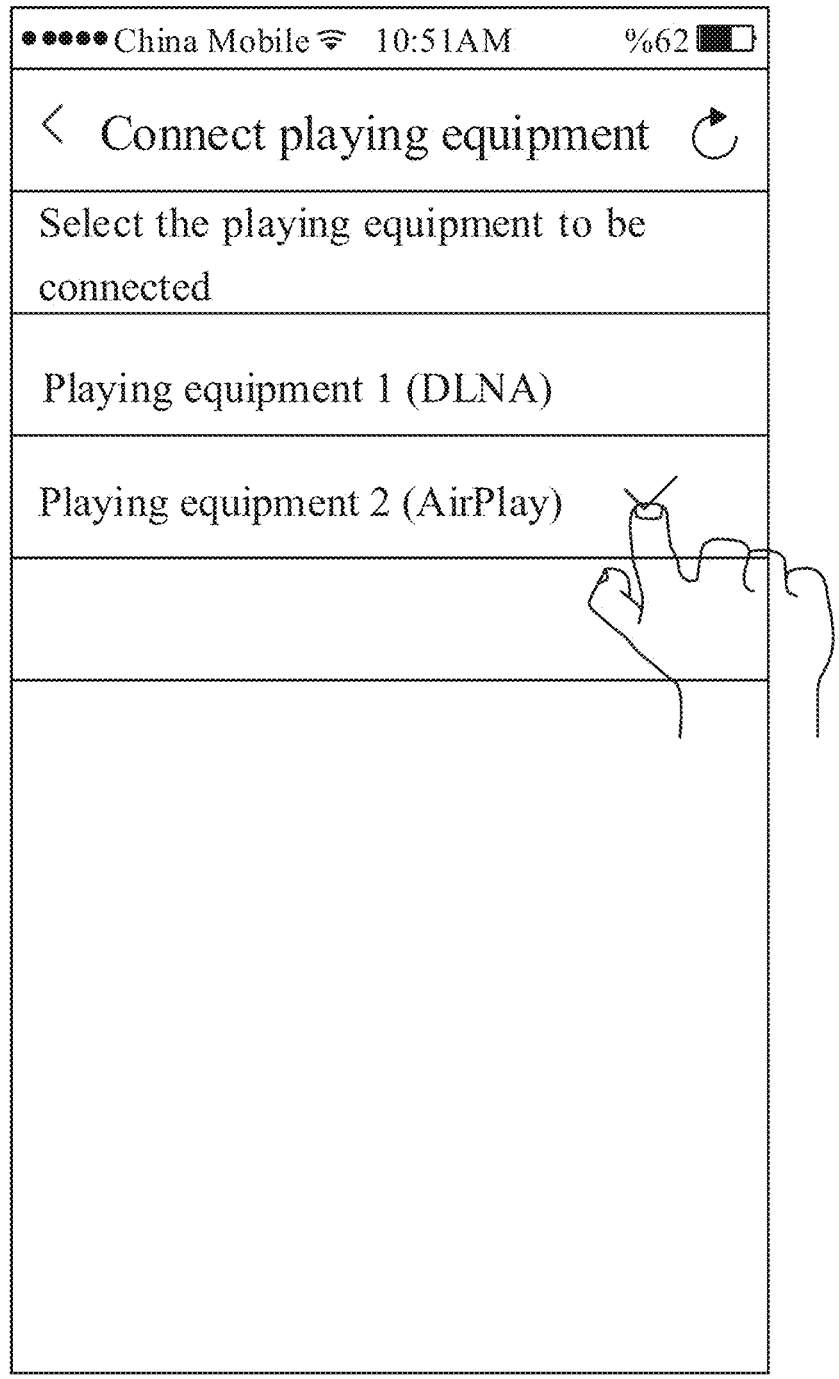
FIG. 6 is a schematic diagram of selecting playing equipment according to an embodiment of the present disclosure.

Referring to FIG. 4, in a case that a user selects a first content (the first content is not a specific reference, but is only for being distinguished from a content, i.e. a second content, which is subsequently selected from the list of the contents by the user, and for example, the first content is an episode 01 41 in FIG. 4) from the list of the contents for playing, the mobile terminal, referring to FIG. 5 plays the first content through the local playing service so as to play the first content on the display interface of the mobile terminal. Moreover, a virtual button for projecting the first content may be displayed on the display interface. If a user triggers the virtual button, the mobile terminal may acquire a first projection instruction through the content projection control service (Step 102), and detect (discover) a projection service through the protocol projection control service. In a practical application, one piece of playing equipment usually supports only one projection protocol. In FIG. 1, playing equipment 1 issues projection service 1 supporting the DLNA projection protocol, and playing equipment 2 issues projection service 2 supporting the AirPlay projection protocol. Since the protocol projection control service 1 supports the DLNA projection protocol, the protocol projection control service 1 detects the projection service 1 issued by the playing equipment 1. Similarly, since the protocol projection control service 2 supports the AirPlay projection protocol, the protocol projection control service 2 detects the projection service 2 issued by the playing equipment 2. The protocol projection control service may transmit the information that a projection service is detected to the content projection control service. As shown in FIG. 6, both the playing equipment which may be used for projecting the first content and the projection protocol supported by the playing equipment may be displayed on the display interface of the mobile terminal by the content projection control service through the local playing service. Here, it is supposed that a user selects the projection service 1 (a first projection service) issued by the playing equipment 1 to project the first content.

After the content projection service determines the first projection service, the first content (which may be an address, such as a Uniform Resource Locator (URL), pointing to the first content in a multimedia server) played by the local playing service is intercepted, and the intercepted first content (which may correspondingly be the address of the first content) is transmitted to the protocol projection control service 1 (a first protocol projection control service) (Step 103). Optionally, when the first content played through the local playing service is triggered to be projected, the mobile terminal will not play the first content on the display interface of the mobile terminal through the local playing service any longer, so as to save the display space of the display interface of the mobile terminal. Of course, the mobile terminal may also continue playing the first content through the local playing service.

The mobile terminal transmits the first content to the projection service 1 (the first projection service) through the protocol projection control service 1 (the first protocol projection control service) by virtue of a first projection protocol (Step 104). The projection service 1 plays the first content at the corresponding playing equipment 1 (for example, a player running on the playing equipment 1 is employed). Optionally, the playing progress of the first content played by the local playing service is transmitted to the projection service 1 (the first projection service) through the content projection control service, and the projection service 1 plays the first content on the corresponding playing equipment (the playing equipment 1) according to the playing progress of the first content, so that the content may be continued to be played on the basis of the progress when being switched to the playing equipment 1, and a continuous watching experience can be brought to the user.

Based on the abovementioned processing, it can be seen that: for the condition that a user selects the projection service 2 issued by the playing equipment 2 for projection in FIG. 6, the mobile terminal may intercept the first content played by the local playing service through the content projection control service, transmit the intercepted first content to the protocol projection control service 2 and transmit the first content to the projection service 2 through the protocol projection control service 2 by virtue of the AirPlay projection protocol for the projection service 2 (a player application on the playing equipment 2 is employed, for example) to render and play on the playing equipment 2. Optionally, the mobile terminal does not play the first content on the display interface of the mobile terminal through the local playing service any longer, so as to save the display space of the display interface of the mobile terminal. Optionally, the progress of the first content played by the local playing service is transmitted to the projection service 2 (a second projection service) through the content projection control service, and the projection service 1 plays the first content on the corresponding playing equipment (the playing equipment 2) on the basis of the playing progress of the first content, so that the continuous watching experience can be brought to the user.

In the example 1), the content projection service cooperates with different protocol projection control services (supporting different projection protocols), so that content projection may be compatibly implemented at playing equipment issuing different projection services (i.e. services using different projection protocols) based on different projection protocols.

EXAMPLE 2

Figure 7:
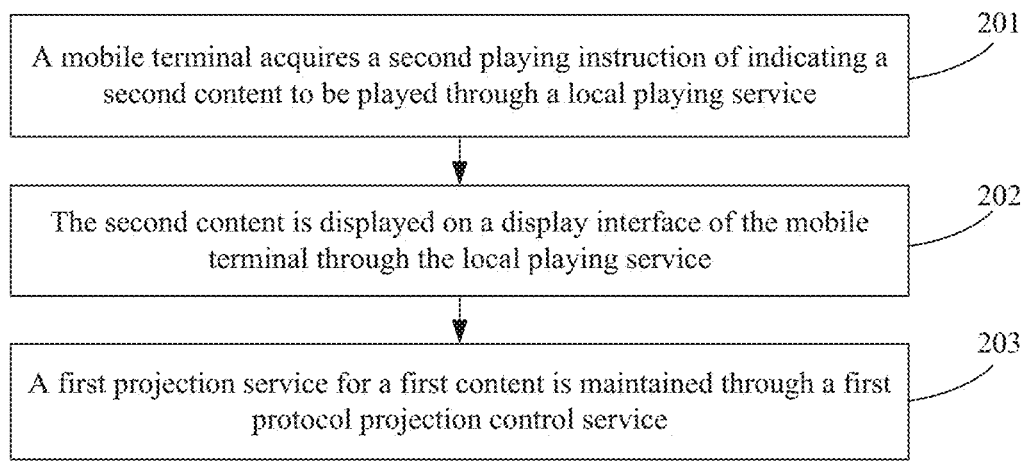
FIG. 7 is schematic diagram 2 of implementing a method for content projection according to an embodiment of the present disclosure.

Corresponding to the function 2), when a mobile terminal transmits a first content to playing equipment 1 issuing projection service 1 (a first projection service) through protocol projection control service 1 (a first protocol projection control service) in the example 1), the first content is played on the playing equipment 1 through the projection service 1. Optionally, a status control interface of the protocol projection control service 1 (the first protocol projection control service) for the projection service 1 is displayed on a display interface of the mobile terminal. At this moment, a user of the mobile terminal is expected to play a second content (i.e. a content different from the first content) on the mobile terminal on the premise of not interrupting the projection service 1 from playing the first content on the playing equipment 1. Accordingly, the user may trigger the second content to be played in a content list displayed by a projection application. Correspondingly, referring to FIG. 7, the mobile terminal may acquire, through local playing service, a second playing instruction of indicating the second content to be played (Step 201), play the second content on the display interface of the mobile terminal through the local playing service (Step 202), and maintain the projection service 1 (the first projection service) for the first content through the first protocol projection control service (Step 203), that is, the projection service 1 continues playing the first content on the mobile terminal. Optionally, the status control interface of the protocol projection control service 1 (the first protocol projection control service) for the projection service 1 can be continued to be displayed on the display interface of the mobile terminal.

In the example 2), the second content is played on the mobile terminal on the premise of not interrupting the projection service 1 from playing the first content on the playing equipment 1. In a practical application, the user may project a film onto a television in a living room for playing by the mobile terminal, and meanwhile, the user may operate the mobile terminal for another operation, for example, browsing a webpage, without having influence on playing of the film on the television in the living room.

EXAMPLE 3

Figure 8:
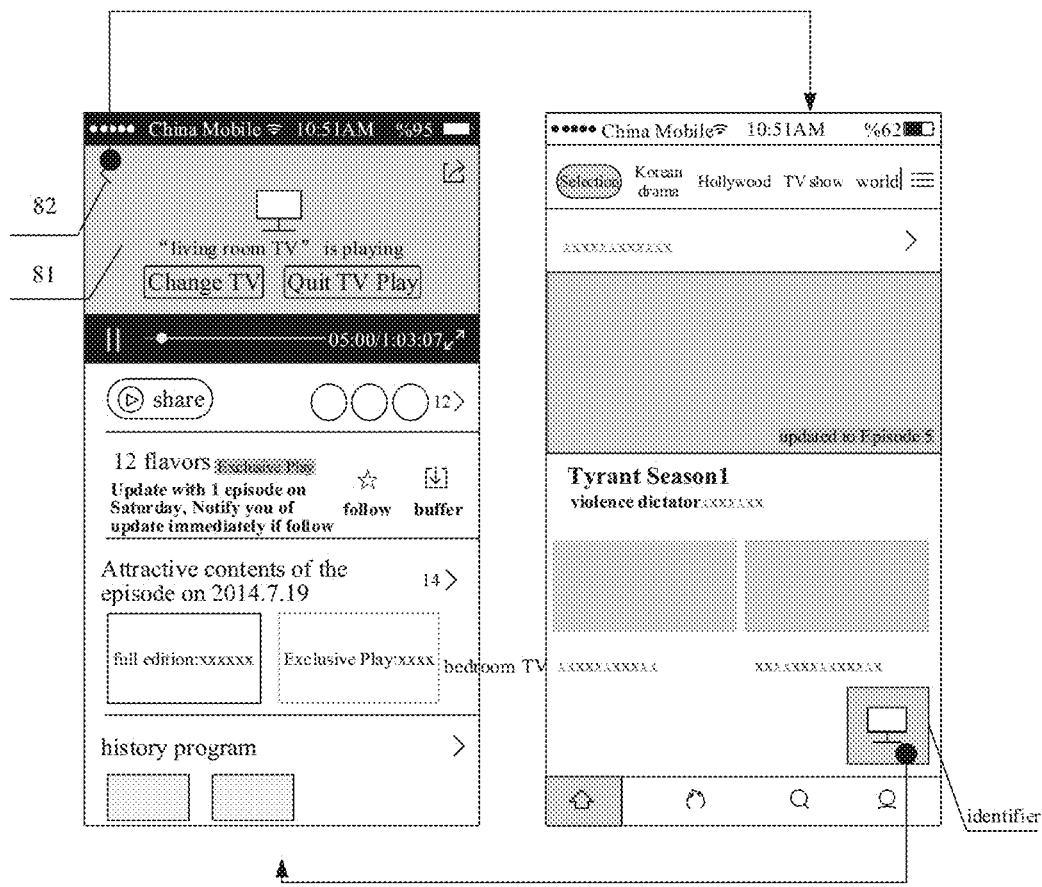
FIG. 8 is a schematic diagram of a status control interface for projecting a first content according to an embodiment of the present disclosure.
Figure 9:
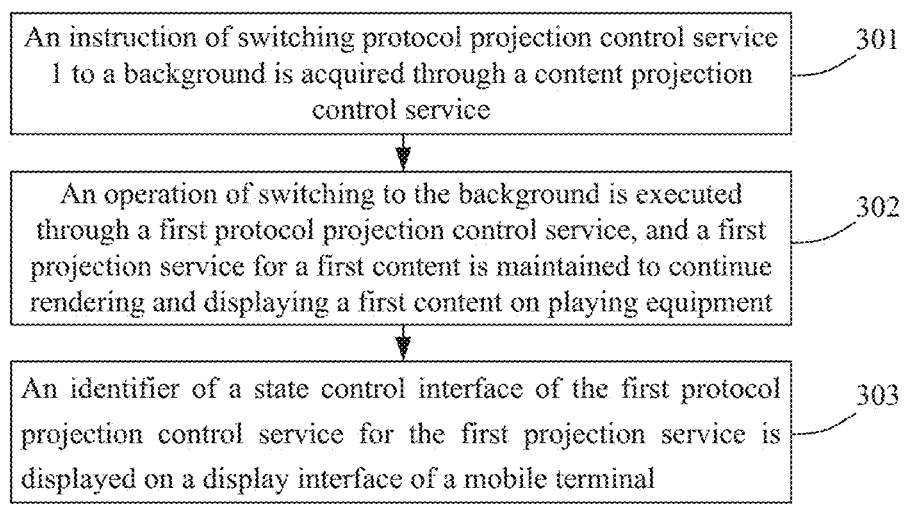
FIG. 9 is schematic diagram 3 of implementing a method for content projection according to an embodiment of the present disclosure.

Corresponding to the function 3), when a mobile terminal transmits a first content to playing equipment 1 issuing projection service 1 (a first projection service) through protocol projection control service 1 (a first protocol projection control service) in the example 1), the first content is played on the playing equipment 1 through the projection service 1. Referring to FIG. 8, a status control interface 81 of the protocol projection control service 1 (the first protocol projection control service) for the projection service 1 (the first projection service) is displayed on a display interface of the mobile terminal. At this moment, a user of the mobile terminal may also need to switch the protocol projection control service 1 (the first protocol projection control service) to a background (that is, the status control interface for the projection service 1 is switched to the background), thereby locally watching a second content (different from the first content) on the mobile terminal by a projection application or executing an operation (for example, listening to the radio and browsing a webpage) on another application in the mobile terminal. Correspondingly, referring to FIG. 8 in combination with FIG. 9, the user may trigger a virtual button for switching to the background on the status control interface 81 of the protocol projection control service 1 (the first protocol projection control service) for the projection service 1 (the first projection service), that is, when the mobile terminal transmits the first content to the projection service 1 (the first projection service) through the protocol projection control service 1 (the first protocol projection control service), an instruction of switching the protocol projection control service 1 to the background is acquired through a content projection control service (Step 301). An operation of switching to the background is executed through the protocol projection control service 1 (the first protocol projection control service), and the projection service 1 (the first projection service) for the first content continues playing the first content on the playing equipment (Step 302).

Figure 10:
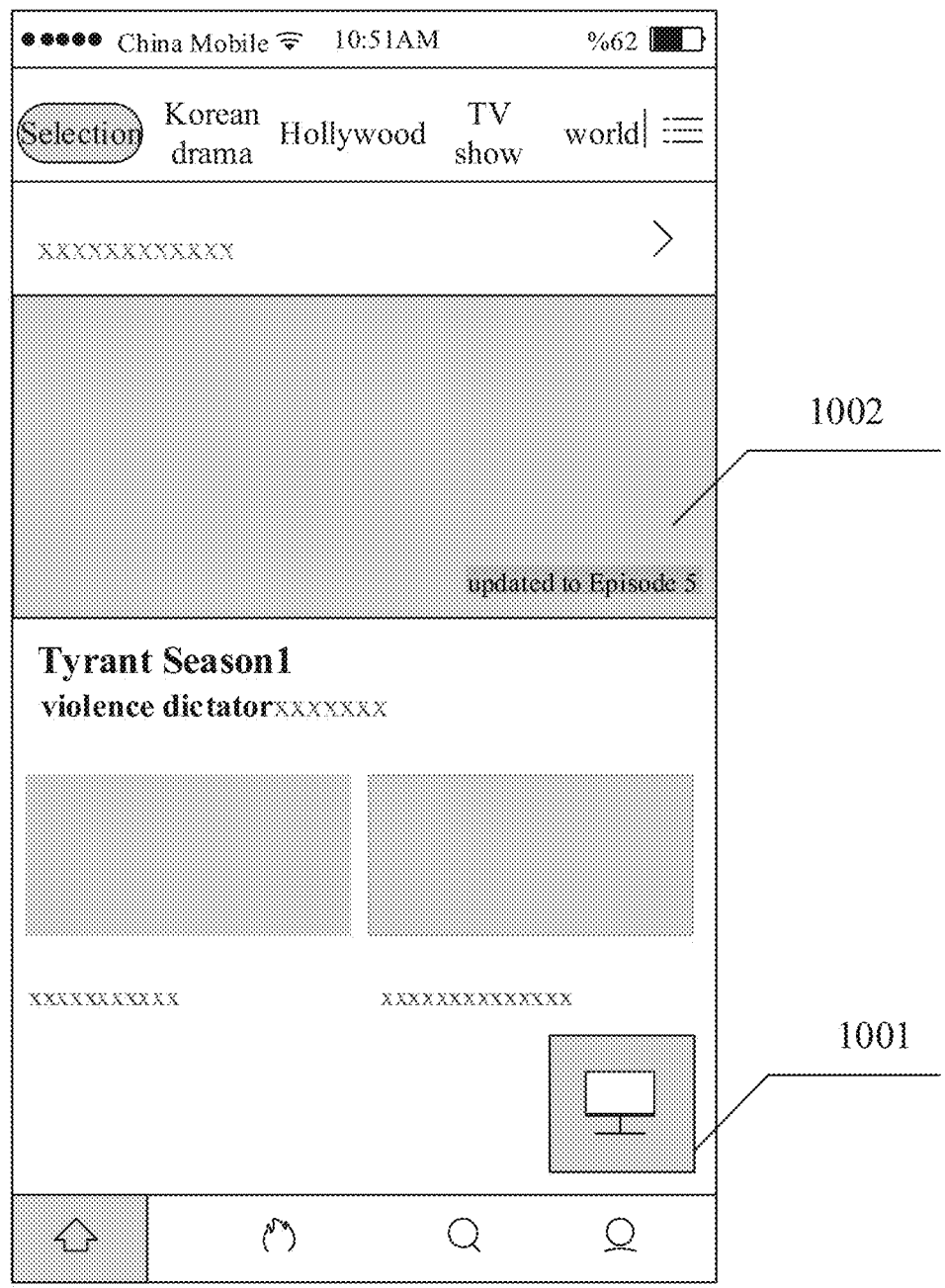
FIG. 10 is a schematic diagram of playing a second content on a mobile terminal according to an embodiment of the present disclosure.

Referring to FIG. 10, the mobile terminal may display a content list through a local playing service, so that a user may select and play the second content on the display interface of the mobile terminal through the local playing service. The mobile terminal is supported to play the second content by virtue of the local playing service on the premise of not interrupting the projection service 1 from playing the first content on the playing equipment 1. Of course, the user may also be supported to execute the operation (for example, browsing the webpage) on other applications in the mobile terminal.

Figure 11:
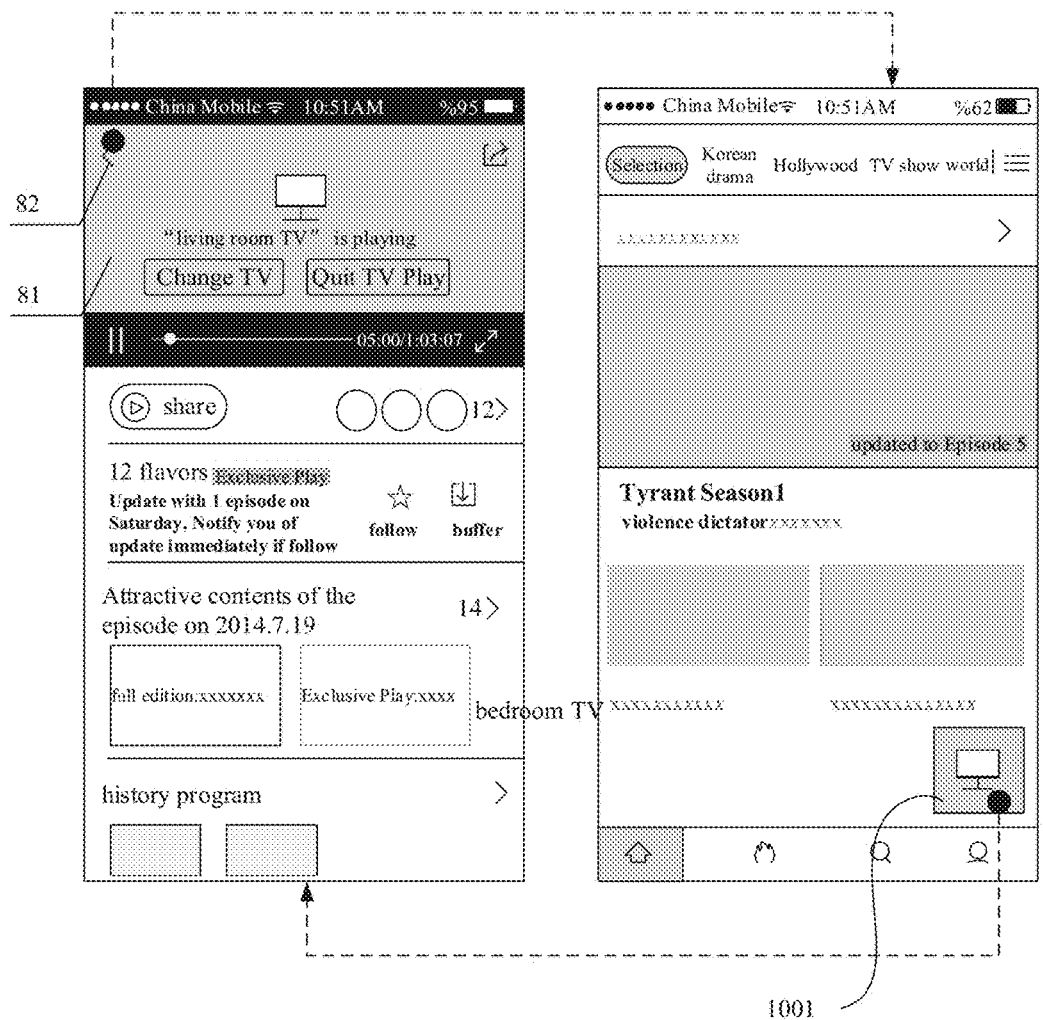
FIG. 11 is a schematic diagram of switching a status control interface for projecting a first content to a background and locally playing a second content on a mobile terminal according to an embodiment of the present disclosure.

Optionally, referring to FIG. 10, after the protocol projection control service 1 (the first protocol projection control service) executes the operation of switching to the background, the second content 1002 is continued to be played in a non-full screen window on the display interface of the mobile terminal, and the status control interface of the protocol projection control service 1 (the first protocol projection control service) for the projection service 1 (the first projection service) is displayed on the display interface (Step 303), wherein an identifier 1001 is included. Referring to FIG. 11, the user may trigger the identifier 1001 to switch the display interface of the mobile terminal to the status control interface 82 of the protocol projection control service 1 (the first protocol projection control service) for the projection service 1 (the first projection service).

In the example 3), the status control interface of the protocol projection control service 1 (the first protocol projection control service) for the projection service 1 (the first projection service) is also supported to be switched to the background on the premise of not interrupting the projection service 1 from playing the first content on the playing equipment 1, so that the user may select the second content from the content list of the projection application for playing, or execute the operation on other application in the mobile terminal.

EXAMPLE 4

Figure 12:
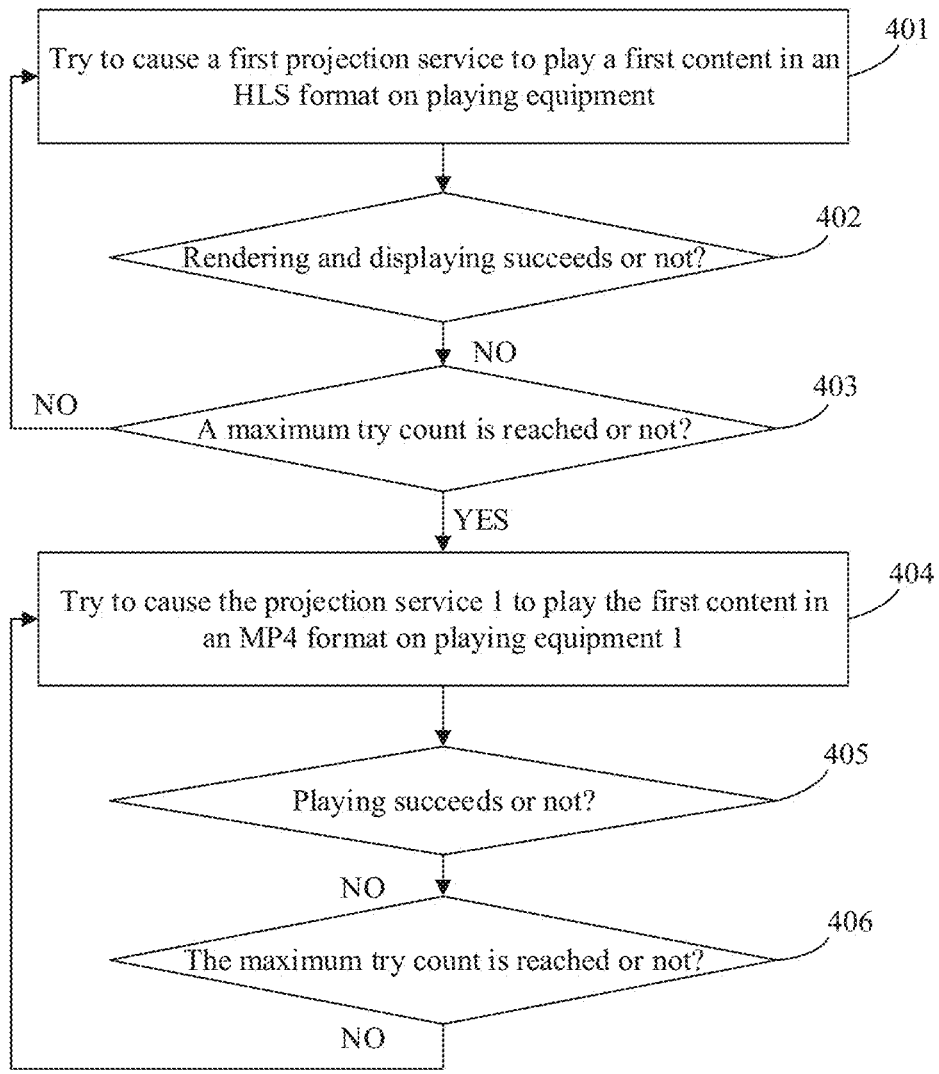
FIG. 12 is schematic diagram 4 of implementing a method for content projection according to an embodiment of the present disclosure.

Corresponding to the function 4), in a practical application, because of differences between playing equipment manufacturers, content formats supported by projection services using the same projection protocol may not be completely the same. For example, some projection services support a Hyper Text Transfer Protocol (HTTP) Live Streaming (HLS) format, and some projection services support a Moving Picture Experts Group Audio Layer-4 (MP4) format. In view of this, referring to FIG. 12, when a mobile terminal transmits a first content to projection service 1 (a first projection service) through protocol projection control service 1 (a first protocol projection control service) by virtue of a DLNA projection protocol (a first projection protocol) in the example 1), the mobile terminal tries to cause, through the first protocol projection control service by virtue of the first projection protocol, the projection service 1 (the first projection service) to play the first content in the HLS format on corresponding playing equipment (playing equipment issuing the projection service), i.e. playing equipment 1 (Step 401); in case of failure (Step 402), the mobile terminal continues trying to cause the projection service 1 (the first projection service) to play the first content in the HLS format on the corresponding playing equipment (the playing equipment issuing the projection service 1), i.e. the playing equipment 1 on the premise of determining that a maximum try count is not reached) (Step 403); the mobile terminal tries to cause the projection service 1 to play the first content in the MP4 format on the playing equipment 1 if it is determined that the maximum try count is reached in Step 403 (Step 404); and in case of failure (Step 405), the mobile terminal continues trying to cause the projection service 1 to play the first content in the MP4 format on the playing equipment 1 on the premise of determining that the maximum try count is not reached until the projection service 1 successfully plays the first content in a certain format on the corresponding playing equipment 1 (Step 406).

Optionally, when the first projection service tries to play the first content in a format on corresponding playing equipment, multiple tries may be made. When the maximum try count is reached, the first projection service tries to play the first content in another format on the corresponding playing equipment.

EXAMPLE 5

Figure 13:
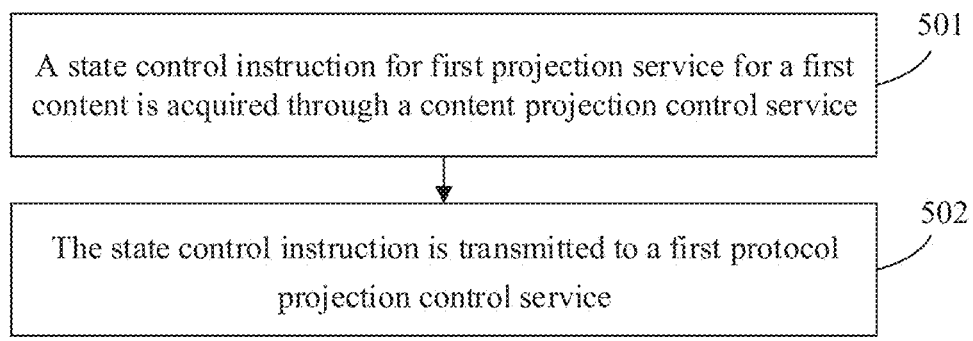
FIG. 13 is schematic diagram 5 of implementing a method for content projection according to an embodiment of the present disclosure.

Corresponding to the function 5), referring to FIG. 13 in combination with FIG. 8, when a status control interface (in which a status of projection service 1 for a first content is displayed) of protocol projection control service 1 (first protocol projection control service) for the projection service 1 (first projection service) is displayed on a display interface of the mobile terminal through a content projection control service, a status control instruction for the projection service 1 (the first projection service) for the first content is acquired through the content projection control service (Step 501), and the status control instruction is transmitted to the protocol projection control service 1 (the first protocol projection control service) (Step 502) for the protocol projection control service 1 to regulate the status, such as video definition, switching of the first content, fast forward and fast backward, volume regulation and playing pausing, of the projection service 1.

Based on the abovementioned processing, it can be seen that: when a status control interface (in which a status of projection service 2 for a second content is displayed) of protocol projection control service 2 (second protocol projection control service) for the projection service 2 (second projection service) is displayed on the display interface of the mobile terminal through the content projection control service, a status control instruction for the projection service 2 (the second projection service) for the second content is acquired through the content projection control service, and the status control instruction is transmitted to the protocol projection control service 2 (the second protocol projection control service) for the protocol projection control service 2 to regulate the status, such as video definition, switching of second content, fast forward and fast backward, volume regulation and playing pausing, of the projection service 2. A user can control the playing of a content on playing equipment through the mobile terminal, and the mobile terminal realizes a remote control function without directly operating the playing equipment, so that an operating experience of the user is improved.

EXAMPLE 6

Figure 14:
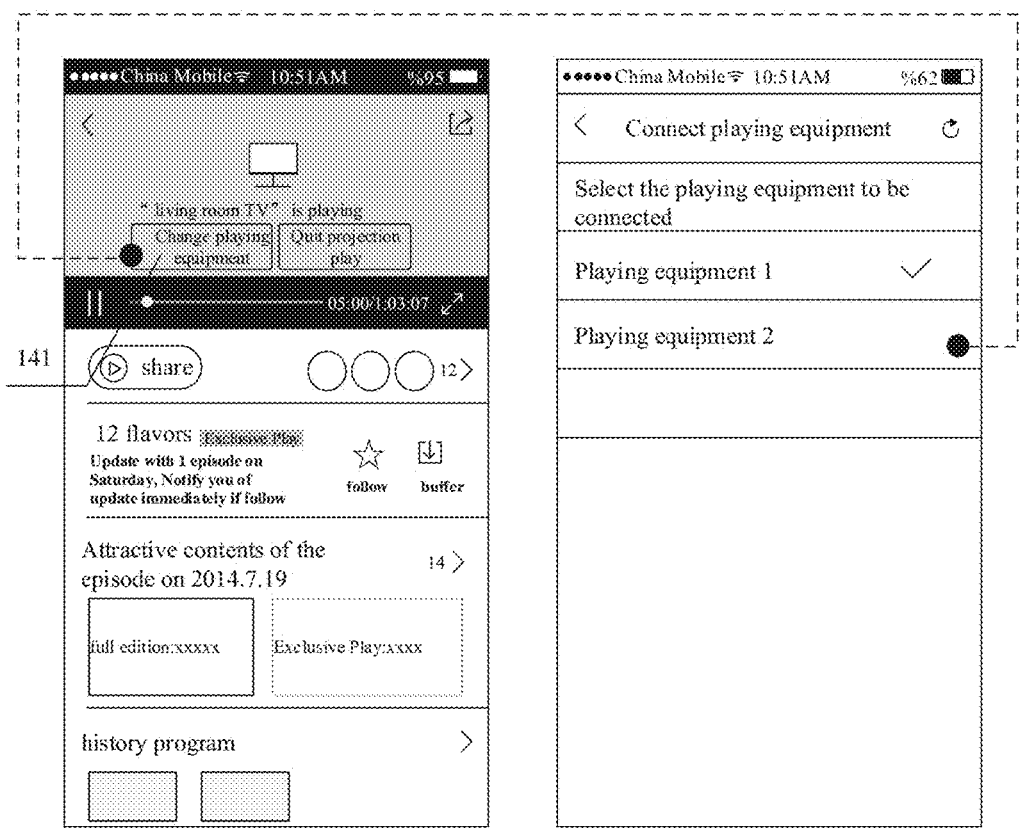
FIG. 14 is a schematic diagram of switching a projection service used for a first content according to an embodiment of the present disclosure.
Figure 15:
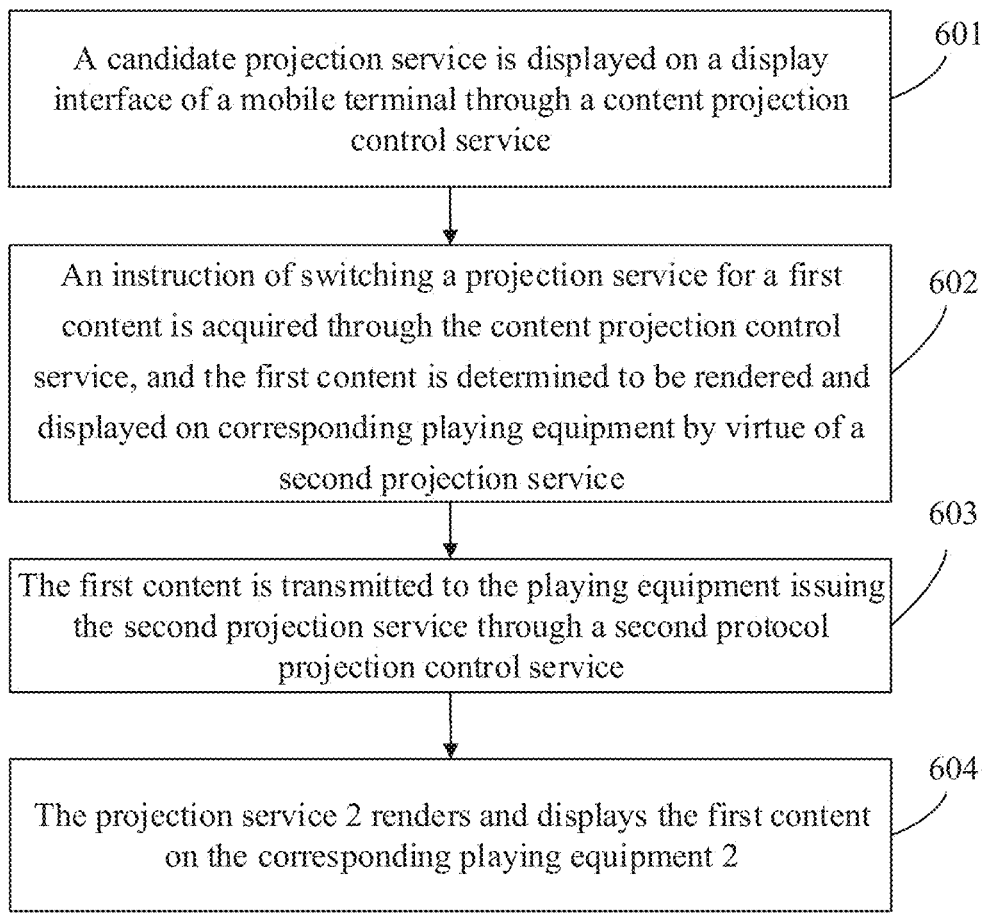
FIG. 15 is schematic diagram 6 of implementing a method for content projection according to an embodiment of the present disclosure.

Corresponding to the example 6), referring to FIG. 1 in combination with the example 1), when a mobile terminal transmits a first content to playing equipment 1 issuing projection service 1 (a first projection service) through protocol projection control service 1 (a first protocol projection control service), the first content is played on the playing equipment 1 through the projection service 1. Then, a user may need to switch the playing equipment for projecting the first content. For example, the user need to render and play the first content on playing equipment 2 by virtue of projection service (second projection service) issued by the playing equipment 2. Correspondingly, referring to FIG. 15 in combination with FIG. 14, a status control interface for the projection service 1 for the first content is displayed on a display interface of the mobile terminal through a content projection control service. A user triggers a virtual button 141 for switching the playing equipment on the status control interface to cause the mobile terminal to display a candidate projection service, including the projection service 1 (the playing equipment 1 is used) and the projection service 2 (the playing equipment 2 is used), on the display interface of the mobile terminal through the content projection control service (Step 601). The projection service 1 is a projection service issued by the playing equipment 1 and detected by the protocol projection control service 1. The projection service 1 and the protocol projection control service 1 both support a DLNA projection protocol (a first projection protocol). The projection service 2 is a projection service issued by the playing equipment 2 and detected by protocol projection control service 2. The projection service 2 and the protocol projection control service 2 both support an Airplay projection protocol (a second projection protocol).

It is supposed that the user selects to switch to the playing equipment 2, that is, the first content is played on the playing equipment by virtue of the projection service 2. Correspondingly, the mobile terminal acquires an instruction of switching the projection service used for the first content through the content projection control service, and determines to play the first content on the playing equipment by virtue of the projection service 2 (the second projection service) (Step 602).

The mobile terminal transmits the first content to the playing equipment 2 issuing the projection service 2 (the second projection service) through the protocol projection control service 2 (a second protocol projection control service) (Step 603) so as to cause the projection service 2 to play the first content on the corresponding playing equipment 2 (Step 604), wherein the second protocol projection control service is one of the at least two protocol projection control services, which detects the second projection service. The second protocol projection control service and the second projection service both support the second projection protocol.

Optionally, the mobile terminal may store, through the content projection control service, progress information of the first content played by the projection service (the first projection service) and transmit the progress information to the projection service 2 (the second projection service), thereby causing the projection service 2 to continue playing the first content on the basis of the progress information of the first content to ensure continuity of playing of the first content on different playing equipment by virtue of the projection service and bring a good watching experience to the user.

EXAMPLE 7

Figure 16:
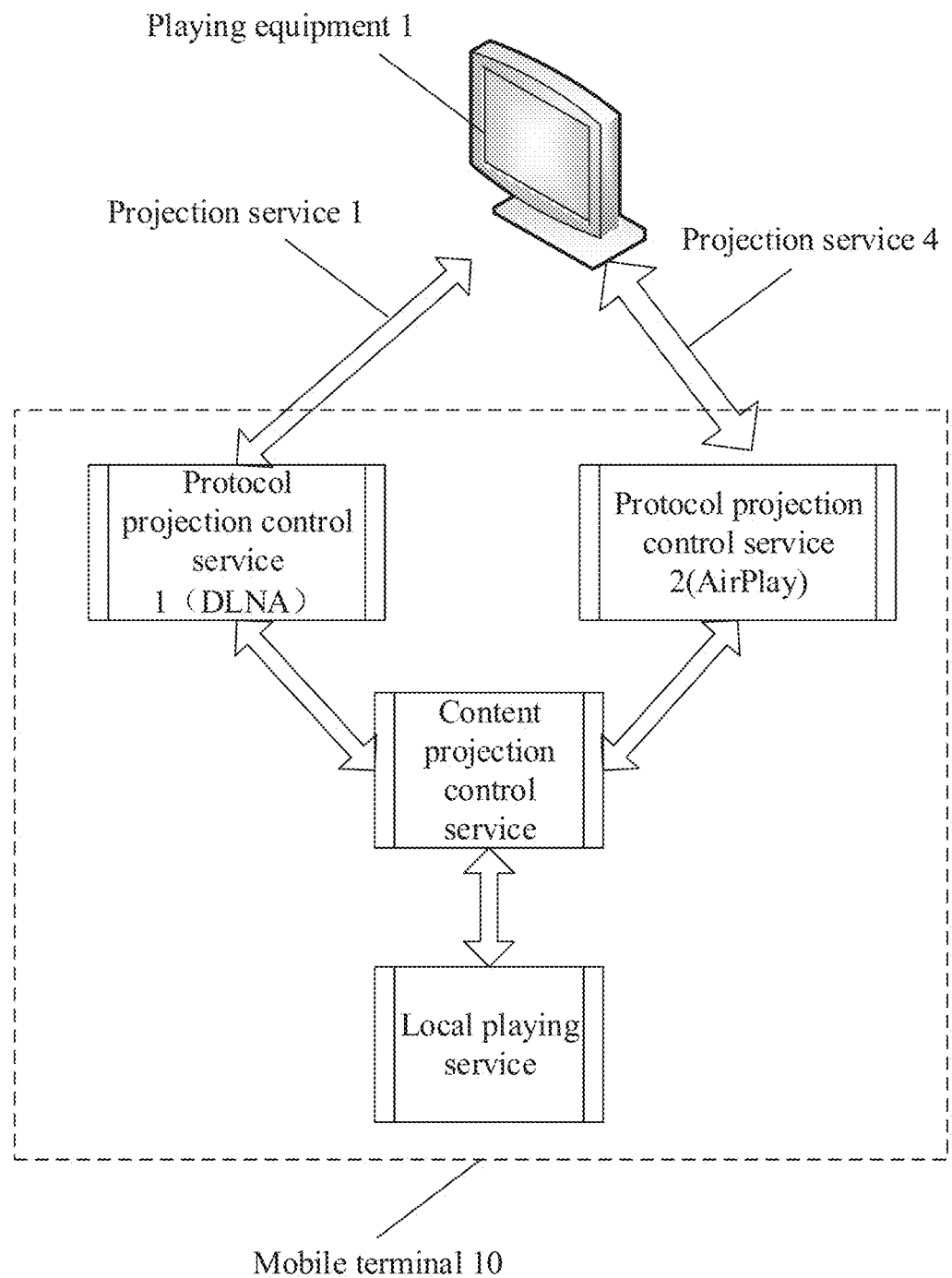
FIG. 16 is schematic diagram 3 of running a service at a mobile terminal according to an embodiment of the present disclosure.

Corresponding to the function 7), referring to FIG. 16, it is supposed that playing equipment 1 issues projection service 1 supporting DLNA and projection service 4 supporting an AirPlay projection protocol. Protocol projection control service 1 (supporting the DLNA projection protocol) run by a mobile terminal detects the projection service 1 issued by the playing equipment 1, protocol projection control service 3 (corresponding to third protocol projection control service and supporting the DLNA projection protocol) run by the mobile terminal detects the projection service 1 issued by the playing equipment 1, and protocol projection control service 2 supporting the AirPlay projection protocol detects the projection service 4 issued by the playing equipment. It is supposed that the mobile terminal transmits a first content to the playing equipment 1 issuing the projection service 1 (a first projection service) through the protocol projection control service 1 (a first protocol projection control service), and the first content is played on the playing equipment 1 through the projection service 1. Specific implementation refers to the example 1).

Figure 17:
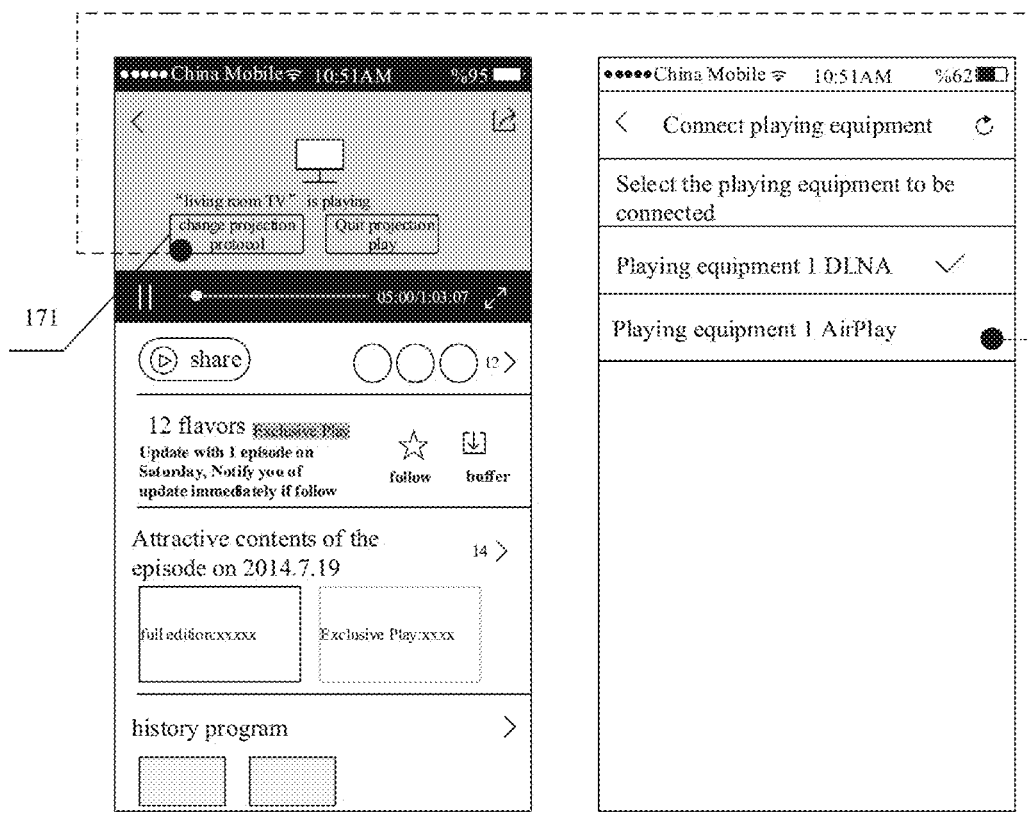
FIG. 17 is a schematic diagram of switching a projection protocol which is for projecting a first content according to an embodiment of the present disclosure.

A user may expect the playing equipment 1 to change the projection protocol for projecting the first content. Referring to FIG. 17, the user selects to use the projection service 4 for playing the first content on the playing equipment 1 by virtue of the AirPlay projection protocol. Correspondingly, the mobile terminal displays a status control interface for the projection service 1 for the first content on a display interface of the mobile terminal through a content projection control service, and the user triggers a virtual button 171 for switching the projection protocol on the status control interface to trigger the mobile terminal to display candidate projection protocols on the display interface of the mobile terminal through the content projection control service (Step 701). The candidate projection protocols are the projection protocols supported by the protocol projection control service 1 and the protocol projection control service 3, including the DLNA projection protocol and the AirPlay projection protocol.

Figure 18:
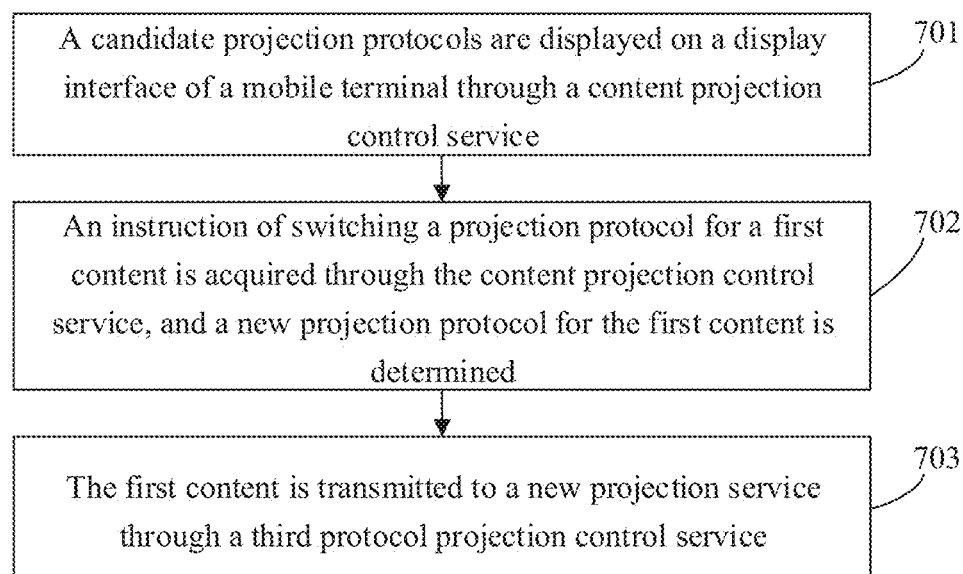
FIG. 18 is schematic diagram 7 of implementing a method for content projection according to an embodiment of the present disclosure.

After the user selects the projection protocol for switching (it is supposed that the AirPlay projection protocol is selected), referring to FIG. 18, the mobile terminal acquires an instruction of switching the projection protocol for the first content through the content projection control service, determines a new projection protocol, i.e. the AirPlay projection protocol, for the first content (Step 702), and transmits the first content to the projection service 4 (a new projection service supporting the new projection protocol i.e. the AirPlay projection protocol) through the protocol projection control service 3 (the third protocol projection control service) (Step 703) to cause the projection service 4 (the new projection service) to play the first content on the playing equipment issuing the new projection service, i.e. the playing equipment 1 to implement switching of the projection protocol when the playing equipment 1 projects the first content.

Figure 19:
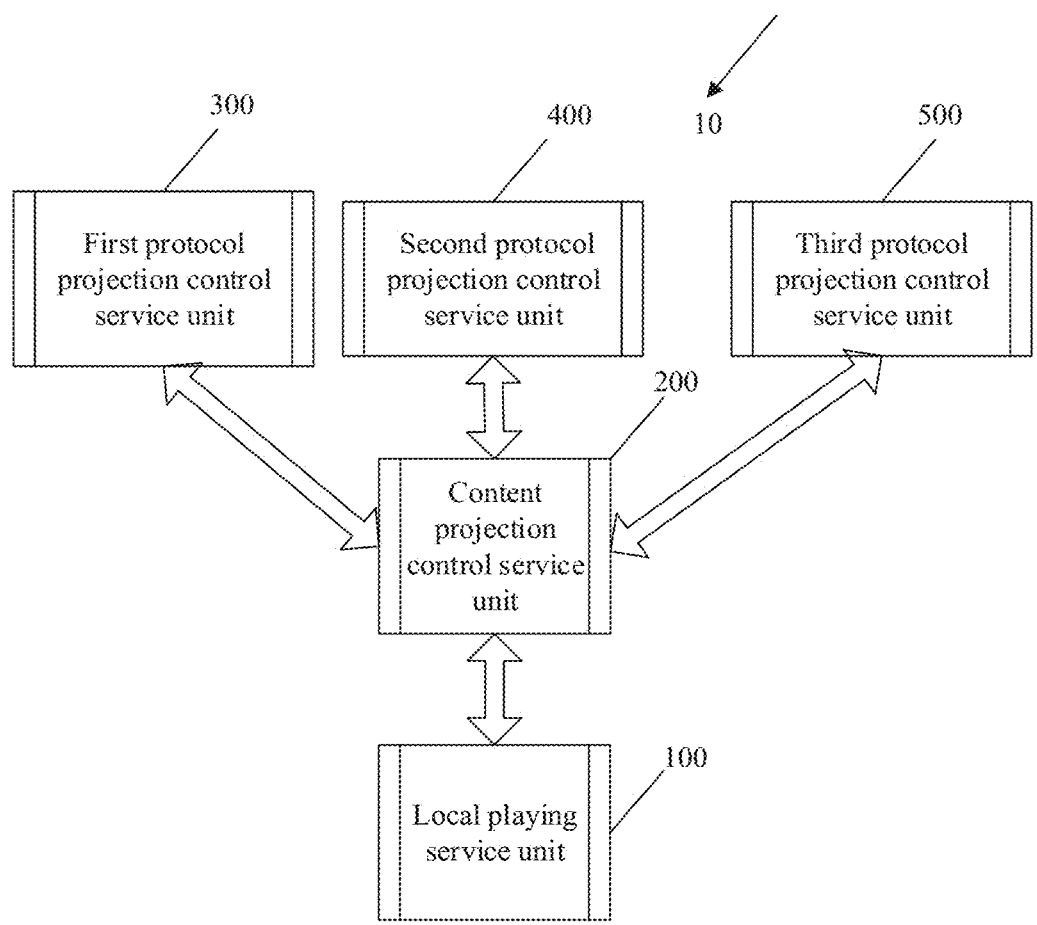
FIG. 19 is a schematic diagram of a logic function structure of a mobile terminal according to an embodiment of the present disclosure.

The embodiments of the present disclosure also provide a mobile terminal, which, referring to an optional structure diagram of a mobile terminal 10 shown in FIG. 19, includes: a local playing service unit 100 (corresponding to the abovementioned local playing service), a content projection control service unit 200 (corresponding to the abovementioned content projection control service) and at least two protocol projection control service units (corresponding to the abovementioned protocol projection control service). In FIG. 19, descriptions are made with a first protocol projection control service unit 300, a second protocol projection control service unit 400 and a third protocol projection control service unit 500 as an example. Different protocol projection control service units support different projection protocols. Exemplarily, the first protocol projection control service unit 300 supports a DLNA projection protocol, the second protocol projection control service unit 400 supports an AirPlay projection protocol, and the third protocol projection control service unit 500 supports a Miracast projection protocol.

The content projection control service unit 200 is configured to acquire a first projection instruction, intercept a first content played by the local playing service unit 100, and transmit the intercepted first content to the first protocol projection control service unit 300, wherein the first protocol projection control service unit 300 is a protocol projection control service unit, among the at least two protocol projection control service units, which detects first projection service issued by playing equipment.

The first protocol projection control service unit 300 is configured to transmit the first content to the first projection service by virtue of a first projection protocol, the first content being configured for the first projection service to play on the corresponding playing equipment, wherein the first protocol projection control service unit 300 and the first projection service both support the first projection protocol.

Exemplarily, the first protocol projection control service unit 300 is further configured to, when the first content is transmitted to the playing equipment issuing the first projection service, acquire a second playing instruction of indicating a second content to be played through the local playing service unit 100, the second content being different from the first content.

The local playing service unit 100 is further configured to play the second content on a display interface of the mobile terminal, and maintain the first projection service for the first content through the first protocol projection control service unit 300.

Exemplarily, the first protocol projection control service unit 300 is further configured to, when the first content is transmitted to the first projection service, acquire, through the content projection control service unit 200, an instruction of switching the first protocol projection control service unit 300 to a background.

The first protocol projection control service unit 300 is further configured to execute an operation of switching to the background and maintain the first projection service for the first content.

Exemplarily, the first protocol projection control service unit 300 is further configured to cause the first projection service to play the first content in different formats on the corresponding playing equipment until the first projection service successfully plays the first content on the corresponding playing equipment.

Exemplarily, the content projection control service unit 200 is further configured to display a status control interface on the display interface of the mobile terminal, a status of the first projection service for the first content being displayed on the status control interface.

The content projection control service unit 200 is further configured to acquire a status control instruction for the first projection service for the first content, and transmit the status control instruction to the first protocol projection control service unit 300 to cause the first protocol projection control service unit 300 to regulate the status of the first projection service.

Exemplarily, the content projection control service unit 200 is further configured to display a candidate projection service on the display interface of the mobile terminal, the candidate projection service being at least one piece of projection service detected by the at least two protocol projection control service units and issued by the playing equipment.

The content projection control service unit 200 is further configured to acquire an instruction of switching the projection service for the first content and determine a second projection service for the first content.

The second protocol projection control service unit 400 is further configured to transmit the first content to playing equipment issuing the second projection service, the first content being configured for the second projection service to play on the corresponding playing equipment, wherein the second protocol projection control service unit 400 is further configured as a protocol projection control service unit, among the at least two protocol projection control service units, which detects the second projection service. The second protocol projection control service unit 400 and the second projection service both support a second projection protocol.

Exemplarily, the content projection control service unit 200 is further configured to display a candidate projection protocol on the display interface of the mobile terminal, the candidate projection protocol being a projection protocol supported by a projection service detected by the at least two protocol projection control service units.

The content projection control service unit 200 is further configured to acquire an instruction of switching the projection protocol used for the first content, and determine a new projection protocol used for the first content.

The third protocol projection control service unit 500 is further configured to transmit the first content to a new projection service to cause the new projection service to play the first content on the corresponding playing equipment. The third protocol projection control service unit 500 is a protocol projection control service unit using the new projection protocol.

The units in the mobile terminal may be implemented by running a specific service in an application (such as a projection application like the Tencent video) in a memory by a processor in the mobile terminal. For example, a function of the local playing service unit 100 can be realized by running the abovementioned local playing service, a function of the content projection control service unit 200 can be realized by running the abovementioned content projection control service, and functions of the protocol projection control service units can be realized by running the abovementioned protocol projection control service.

Figure 20:
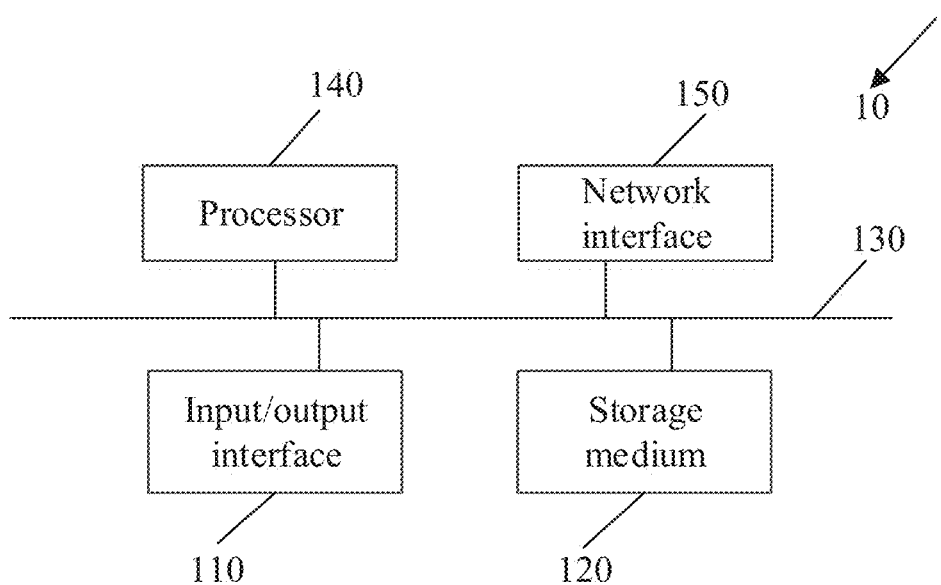
FIG. 20 is a schematic diagram of a hardware structure of a mobile terminal according to an embodiment of the present disclosure.

It is to be pointed out that the mobile terminal may adopt a hardware structure shown in FIG. 20. In an optional hardware structure diagram of the mobile terminal 10 shown in FIG. 20, the mobile terminal 10 includes: a processor 140, an input/output interface 110 (such as at least one of a display, a keyboard, a touch screen and a loudspeaker microphone), a storage medium 120 and a network interface 150. The network interface 150 is configured to support data transmission with external equipment, and the components may be connected for communication through a system bus 130.

The embodiments of the present disclosure also provide a computer-readable medium, which may be a Read-Only Memory (ROM) (such as a ROM, a FLASH memory and a transfer device), a magnetic storage medium (such as a magnetic tape and a disk drive), an optical storage medium (such as a Compact Disc Read-Only Memory (CD-ROM), a Digital Video Disk Read-Only Memory (DVD-ROM), a paper card and a paper tape) and a program memory of another well-known type. A computer-executable instruction is stored in the computer-readable medium (such as binary executable instructions of the projection application like the Tencent video), and the instructions are executed to cause at least one processor to execute the following operations:

running a local playing service, a content projection control service and at least two protocol projection control services, wherein different protocol projection control service support different projection protocols;

acquiring a first projection instruction through the content projection control service, intercepting a first content played by the local playing service, and transmitting the intercepted first content to first protocol projection control service, wherein the first protocol projection control service is the one of the at least two protocol projection control services, which detects a first projection service issued by playing equipment; and transmitting the first content to the first projection service through the first protocol projection control service by virtue of a first projection protocol, the first content being configured for the first projection service to play on the corresponding playing equipment, wherein the first protocol projection control service and the first projection service both support the first projection protocol.

From the above, the embodiments of the present disclosure have the following beneficial effects.

1) When a user controls a projection application of a mobile terminal to quit playing, projection from projection equipment is also stopped, resulting in that projection and video watching on the mobile terminal cannot be simultaneously implemented. In the embodiments of the present disclosure, improvements are made. When the user quits a playing window or the projection application is switched to a background, a projected content of the playing equipment is not be interrupted, the mobile terminal may still continue controlling a status (such as a volume, a resolution and a progress) of the projected content on the playing equipment, meanwhile, the user may watch another video on the mobile terminal without having influence on projection, and the user may conveniently return a status control interface of the projected video for continuous control through a projection entry.

2) At present, most of projection applications respectively support only one projection protocol, which disables some playing equipment to project due to non-compatibility of protocols. In the present disclosure, at least two mainstream projection protocols such as DLNA and Airplay are integrated, so that a projection stream format can be simultaneously dynamically controlled according to an equipment compatibility condition, compatibility with equipment on the market is achieved as much as possible, and meanwhile, users can conveniently switch the two projection protocols.

Those skilled in the art can know that all or part of the steps of the abovementioned method embodiments may be implemented by instructing related hardware through a program. The abovementioned program may be stored in a computer-readable storage medium, and the program is executed to implement the steps of the abovementioned method embodiments. The storage medium include various media capable of storing program codes such as mobile storage equipment, a Random Access Memory (RAM), a ROM, a magnetic disk or an optical disk.

Or, when being implemented in form of a software function module and sold or used as an independent product, the integrated unit of the present disclosure may also be stored in a computer-readable storage medium. Based on such an understanding, the technical solutions of the embodiments of the present disclosure substantially or partially making contributions to the conventional art may be embodied in form of a software product. The computer software product is stored in a storage medium, including a plurality of instructions configured to enable a piece of computer equipment (which may be a personal computer, a server, network equipment or the like) to execute all or part of the method in each embodiment of the present disclosure. The abovementioned storage medium includes various media capable of storing program codes such as mobile storage equipment, a RAM, a ROM, a magnetic disk or an optical disk.

The above is the specific implementation modes of the present disclosure only and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. A method for content projection, comprising:
    running, by a mobile terminal, a local playing service, a content projection control service and at least two protocol projection control services, wherein different protocol projection control service supports different projection protocols;
    acquiring a first projection instruction through the content projection control service, intercepting a first content played by the local playing service, and transmitting the intercepted first content to a first protocol projection control service, wherein the first protocol projection control service is a protocol projection control service, among the at least two protocol projection control services, which detects a first projection service issued by playing equipment; and transmitting the first content to the first projection service through the first protocol projection control service by virtue of a first projection protocol, the first content being configured for the first projection service to play on a corresponding playing equipment, wherein the first protocol projection control service and the first projection service both support the first projection protocol, wherein a number of the protocol projection control services run by the mobile terminal is determined according to a number of projection protocols to be supported.

2. The method according to claim 1, further comprising:
when the first content is transmitted through the first protocol projection control service to the playing equipment issuing the first projection service, if a second playing instruction of indicating a second content to be played is acquired through the local playing service, playing the second content on a display interface of the mobile terminal through the local playing service, and maintaining the first projection service for the first content through the first protocol projection control service, the second content being different from the first content.

3. The method according to claim 1, further comprising:
when the first content is transmitted to the first projection service through the first protocol projection control service, acquiring through the content projection control service an instruction of switching the first protocol projection control service to a background; and
executing through the first protocol projection control service an operation of switching to the background, and maintaining the first projection service for the first content.

4. The method according to claim 1, wherein transmitting the first content to the first projection service through the first protocol projection control service by virtue of the first projection protocol comprises:
causing the first projection service to try to play the first content in different formats on the corresponding playing equipment through the first protocol projection control service until the first projection service successfully plays the first content in a certain format on the corresponding playing equipment.

5. The method according to claim 1, further comprising:
displaying a status control interface on a display interface of the mobile terminal through the content projection control service, wherein a status of the first projection service for the first content is displayed on the status control interface; and
acquiring a status control instruction for the first projection service for the first content through the content projection control service, and transmitting the status control instruction to the first protocol projection control service to cause the first protocol projection control service to regulate the status of the first projection service.

6. The method according to claim 1, further comprising:
displaying a candidate projection service on a display interface of the mobile terminal through the content projection control service, the candidate projection service being at least one projection service issued by the playing equipment and detected by the at least two protocol projection control services;
acquiring through the content projection control service an instruction of switching a projection service used for the first content, and determining a second projection service to be switched for the first content; and
transmitting through a second protocol projection control service the first content to playing equipment issuing the second projection service, the first content being configured for the second projection service to play on a corresponding playing equipment, wherein the second protocol projection control service is a protocol projection control service, among the at least two protocol projection control services, which detects the second projection service, and the second protocol projection control service and the second projection service both support a second projection protocol.

7. The method according to claim 1, further comprising:
displaying a candidate projection protocol on a display interface of the mobile terminal through the content projection control service, the candidate projection protocol being a projection protocol supported by a projection service detected by the at least two protocol projection control services;
acquiring through the content projection control service an instruction of switching a projection protocol used for the first content, and determining a new projection protocol for the first content; and
transmitting the first content to a new projection service through a third protocol projection control service to cause the new projection service to play the first content on a corresponding playing equipment, the third protocol projection control service being a protocol projection control service using the new projection protocol.

8. The method according to claim 2, wherein a playing progress of the first content played by the local playing service is transmitted to the first projection service through the content projection control service, and the first projection service plays the first content on the playing equipment according to the playing progress of the first content.

9. The method according to claim 3, wherein if second content is played on a display interface of the mobile terminal and after the first protocol projection control service is switched to the background, then the second content is continued to be played in a non-full screen window on the display interface of the mobile terminal.

10. The method according to claim 4, wherein the first projection service tries to play the first content in one format on the corresponding playing equipment for multiple times before success; when a maximum try count is reached, the first projection service tries to play the first content in another format on the corresponding playing equipment.

11. The method according to claim 6, wherein the mobile terminal stores, through the content projection control service, progress information of the first content played by the first projection service and transmit the progress information to the second projection service.

12. A mobile terminal, comprising:
a processor; and
a memory storing instructions that, when executed by the processor, cause the processor to:
run a local playing service, a content projection control service and at least two protocol projection control services, wherein different protocol projection control service supports different projection protocols;
acquire a first projection instruction through the content projection control service, intercept a first content played by the local playing service, and transmit the intercepted first content to a first protocol projection control service, wherein the first protocol projection control service is a protocol projection control service, among the at least two protocol projection control services, which detects a first projection service issued by playing equipment; and transmit the first content to the first projection service through the first protocol projection control service by virtue of a first projection protocol, the first content being configured for the first projection service to play on a corresponding playing equipment, wherein the first protocol projection control service and the first projection service both support the first projection protocol, wherein a number of the protocol projection control services run by the mobile terminal is determined according to a number of projection protocols to be supported.

13. The mobile terminal according to claim 12, wherein the processor is further caused by instructions to:

when the first content is transmitted through the first protocol projection control service to the playing equipment issuing the first projection service, if a second playing instruction of indicating a second content to be played is acquired through the local playing service, play the second content on a display interface of the mobile terminal through the local playing service, and maintain the first projection service for the first content through the first protocol projection control service, the second content being different from the first content.

14. The mobile terminal according to claim 12, wherein the processor is further caused by instructions to:

when the first content is transmitted to the first projection service through the first protocol projection control service, acquire, through the content projection control service, an instruction of switching the first protocol projection control service to a background; and execute, through the first protocol projection control service, an operation of switching to the background, and maintain the first projection service for the first content.

15. The mobile terminal according to claim 12, wherein the processor is further caused by instructions to:

cause the first projection service to try to play the first content in different formats on the corresponding playing equipment through the first protocol projection control service until the first projection service successfully plays the first content in a certain format on the corresponding playing equipment.

16. The mobile terminal according to claim 12, wherein the processor is further caused by instructions to:

display a status control interface on a display interface of the mobile terminal through the content projection control service, wherein a status of the first projection service for the first content is displayed on the status control interface; and acquire a status control instruction for the first projection service for the first content through the content projection control service, and transmit the status control instruction to the first protocol projection control service to cause the first protocol projection control service to regulate the status of the first projection service.

17. The mobile terminal according to claim 12, wherein the processor is further caused by instructions to:

display a candidate projection service on a display interface of the mobile terminal through the content projection control service, the candidate projection service being at least one projection service issued by the playing equipment and detected by the at least two protocol projection control services;

acquire, through the content projection control service, an instruction of switching a projection service used for the first content, and determine a second projection service to be switched for the first content; and transmit, through a second protocol projection control service, the first content to playing equipment issuing the second projection service, the first content being configured for the second projection service to play on a corresponding playing equipment, wherein the second protocol projection control service is a protocol projection control service, among the at least two protocol projection control services, which detects the second projection service, and the second protocol projection control service and the second projection service both support a second projection protocol.

18. The mobile terminal according to claim 12, wherein the processor is further caused by instructions to:

display a candidate projection protocol on a display interface of the mobile terminal through the content projection control service, the candidate projection protocol being a projection protocol supported by a projection service detected by the at least two protocol projection control services;

acquire through the content projection control service an instruction of switching a projection protocol used for the first content, and determine a new projection protocol for the first content; and transmit the first content to a new projection service through a third protocol projection control service to cause the new projection service to play the first content on a corresponding playing equipment, the third protocol projection control service being a protocol projection control service using the new projection protocol.

19. A non-transitory computer-readable storage medium having stored therein instructions that, when executed by a processor of a terminal, cause the terminal to perform a method for content projection, the method comprising:

running, by a mobile terminal, a local playing service, a content projection control service and at least two protocol projection control services, wherein different protocol projection control service supports different projection protocols;

acquiring a first projection instruction through the content projection control service, intercepting a first content played by the local playing service, and transmitting the intercepted first content to a first protocol projection control service, wherein the first protocol projection control service is a protocol projection control service, among the at least two protocol projection control services, which detects a first projection service issued by playing equipment; and transmitting the first content to the first projection service through the first protocol projection control service by virtue of a first projection protocol, the first content being configured for the first projection service to play on a corresponding playing equipment, wherein the first protocol projection control service and the first projection service both support the first projection protocol, wherein a number of the protocol projection control services run by the mobile terminal is determined according to a number of projection protocols to be supported.

* * * * *